Figure 1:
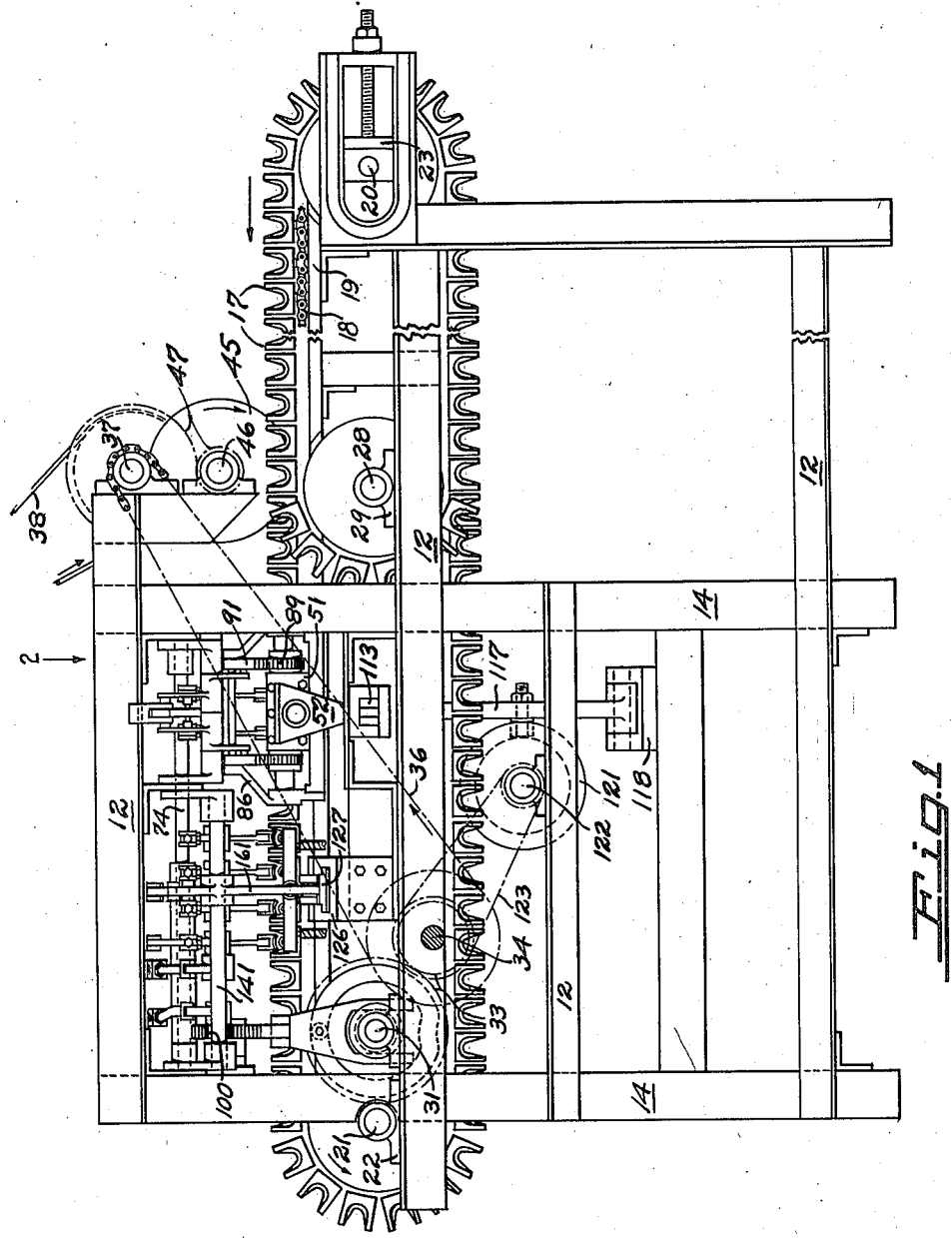

Dec. 30, 1947. K. KURZBIN 2,433,460
FISH DRESSING APPARATUS
Filed Aug. 7, 1943 5 Sheets-Sheet 1

INVENTOR
Karl Kurzbin
BY Charles S. Evans
HIS ATTORNEY

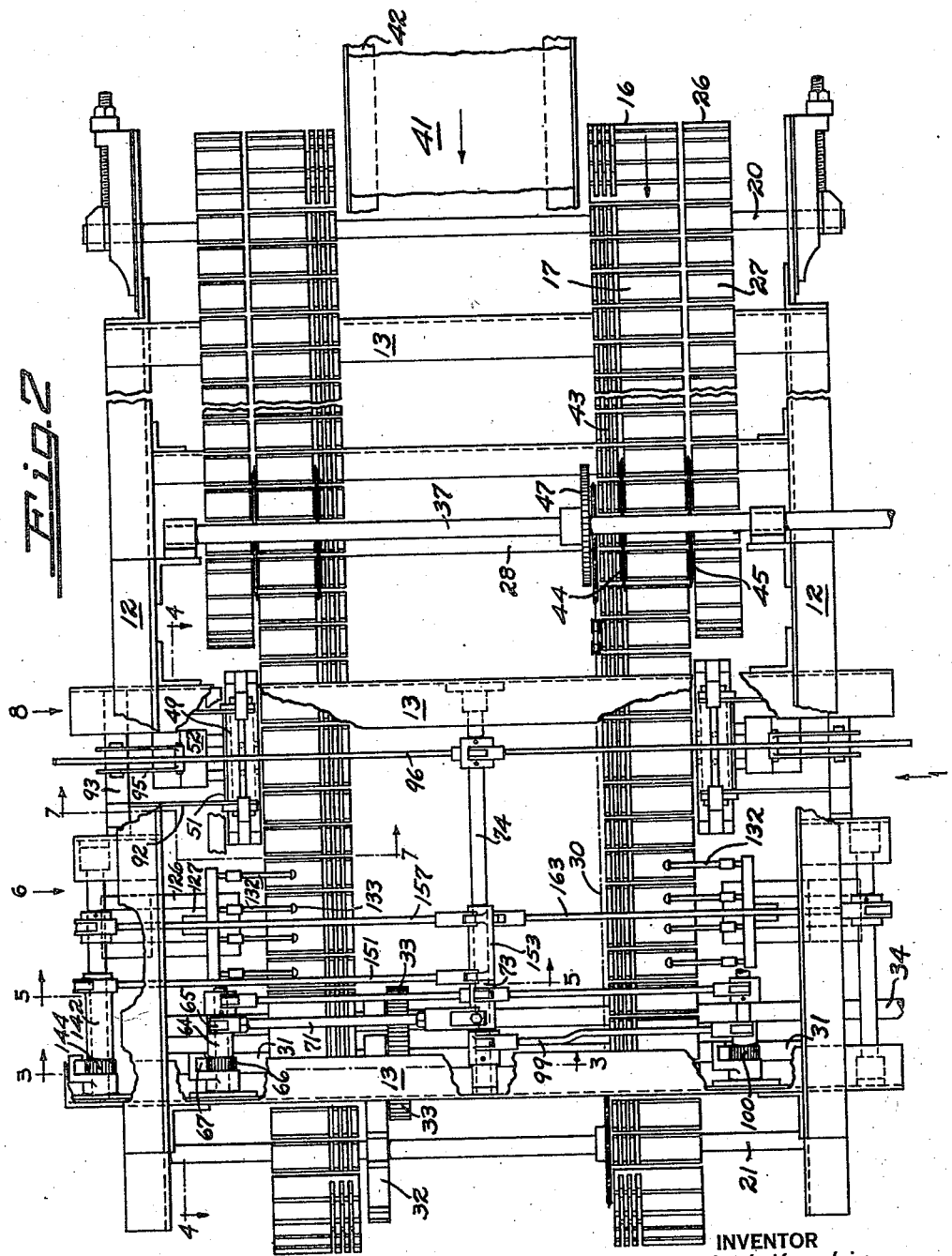

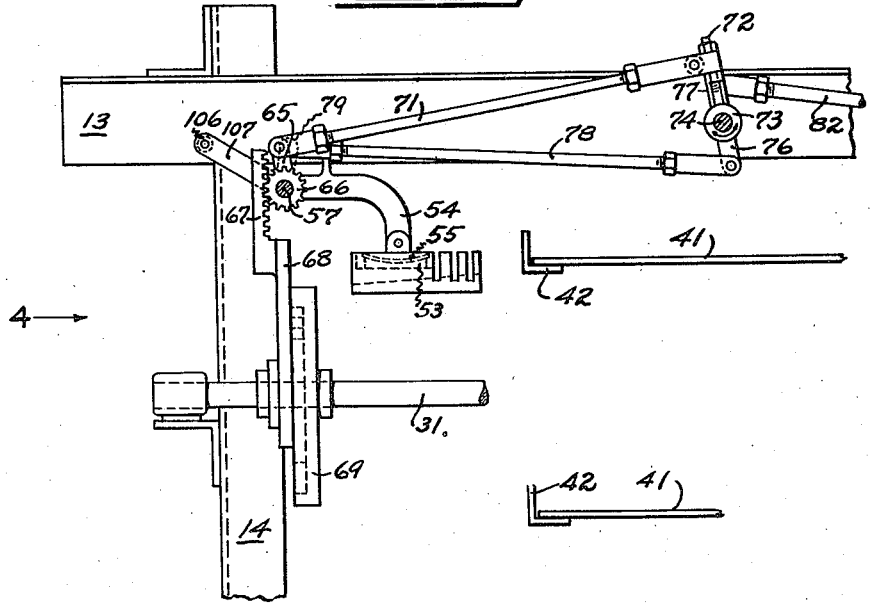
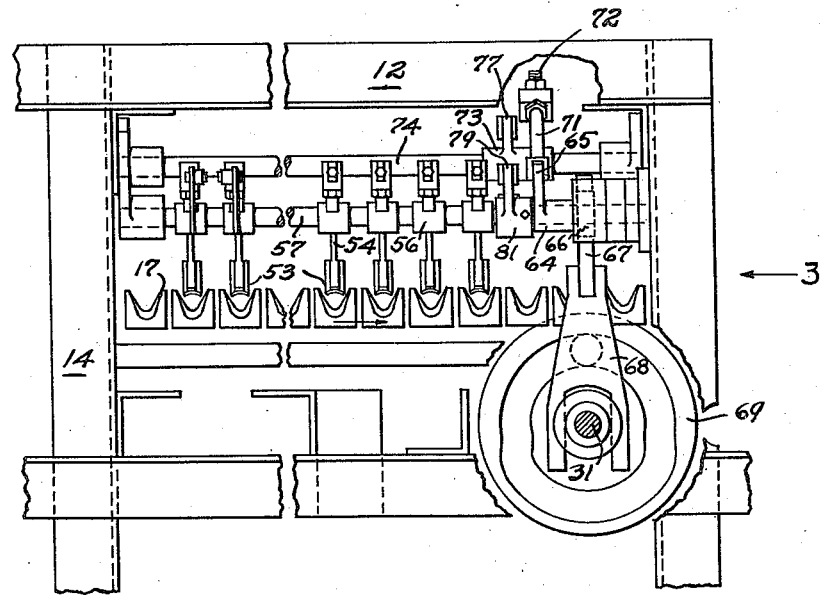

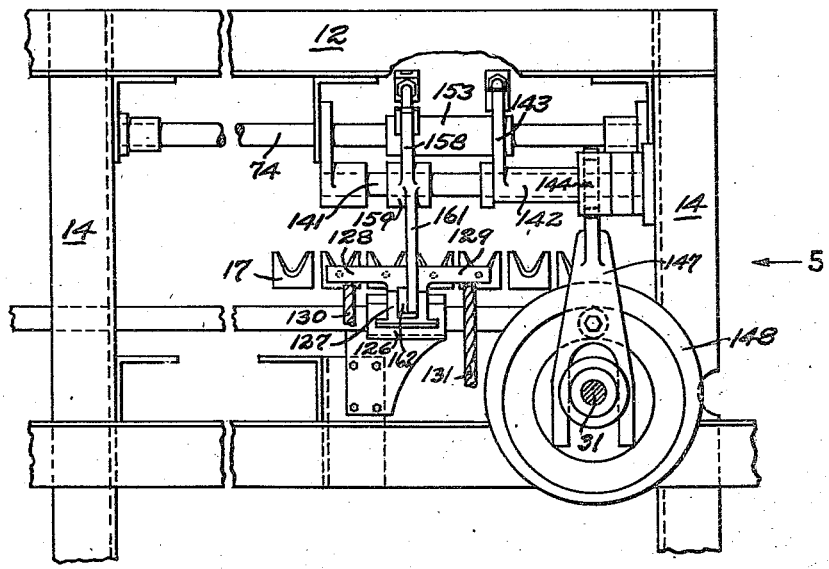

Dec. 30, 1947.  K. KURZBIN  2,433,460
FISH DRESSING APPARATUS
Filed Aug. 7, 1943  5 Sheets-Sheet 5
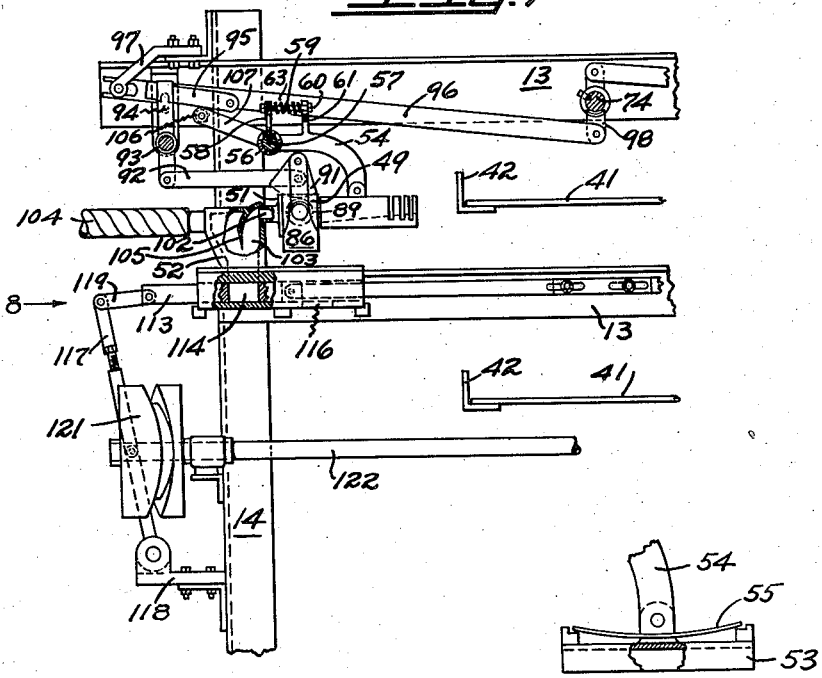
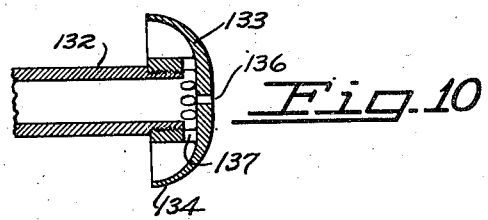
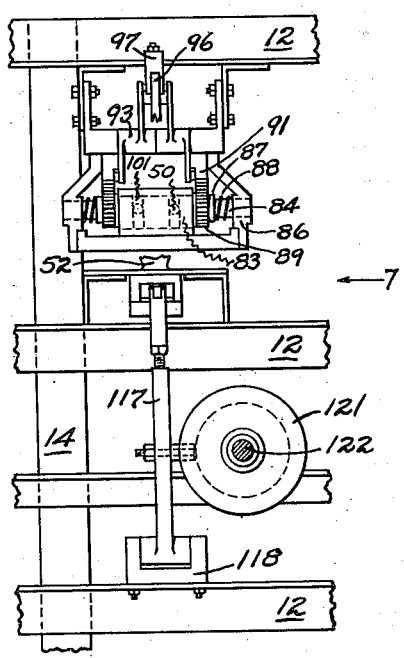
INVENTOR
*Karl Kurzbin*
BY *Charles S. Evans*
HIS ATTORNEY Patented Dec. 30, 1947

2,433,460

UNITED STATES PATENT OFFICE 2,433,460

FISH DRESSING APPARATUS

Karl Kurzbin, Berkeley, Calif.

Application August 7, 1943, Serial No. 497,767

9 Claims. (Cl. 17—3)

My invention relates to machines for preparing fish for canning; and the general object of the invention is to provide an automatic machine into which fish are fed and which removes heads and tails, eviscerates the bodies and thoroughly cleans them, and then passes them along in perfect condition to be placed in a can for processing.

More specific objects include the provision of improved means for applying a vacuum to the fish to withdraw the entrails, and for the disposal of the waste and control of the vacuum.

Another and important object of the invention is the provision of means for applying a hot fluid under pressure to the cavity after evisceration, in such a manner as to loosen and carry out the lining of the cavity together with any loose particles of remaining waste.

Other objects of the invention together with the foregoing will be made clear in the following description of my invention and the preferred embodiment of means for practicing the same, which is illustrated in the drawings accompanying and forming part of this specification. I do not limit myself to the showing made by the description and drawings, as I may adopt variations of the preferred form within the scope of the appended claims.

Referring to the drawings:

Figure 1 is a side elevation of a machine embodying my invention. The fish are introduced at the right hand end; and move through the machine from right to left. Figure 2 is a plan view of the machine. In both Figures 1 and 2 parts are omitted or broken away the better to disclose the structure.

Figures 3, 4, 5, 6, 7 and 8 are all elevations partly in section, of operating mechanism. Figure 3 is an elevation showing part of the mechanism for operating the clamping means which hold the fish during the eviscerating operation. The plane of section is indicated by the line 3—3 at the left of Figure 2. Figure 4 is a side view of such mechanism, the plane of section being indicated by the line 4—4 upper left of Figure 2. Figure 5 is a side view of the fluid jet nozzles and mechanism for operating them, the plane of section being indicated by the line 5—5 at the left of Figure 2. Figure 6 is an elevation of the same nozzles and mechanism, the direction of the view being shown by the arrow 6 above Figure 2 at the left. Figure 7 is an elevation showing the remainder of the fish clamping means, and also the eviscerating mechanism, and Figure 8 is an end elevation of the same. The line 7—7 and the arrow 8 at the top of Figure 2 respectively indicate the plane of section and the direction of view. In all of these views parts have been omitted to simplify the figures, and show underlying parts more clearly.

Figure 9 is a detail in elevation partly in section, showing the construction of the pressure foot on the fish clamp. Figure 10 is a sectional view through the end of the jet pipes. The section is taken in a plane lying in the longitudinal axis of the pipe.

In terms of broad inclusion, my fish dressing apparatus comprises a pair of spaced conveyors each for carrying a succession of fish to and past a succession of operating stations in a step-by-step progression. Means are provided for severing the head and tail at the first operating station; then at the second station means are provided for eviscerating the fish by application of a vacuum; and finally the fish is subjected at the cleaning station to jets of low pressure fluid to loosen the black lining of the visceral cavity and carry it and any adhering waste out of the fish, leaving the body cavity white and clean and the fish in perfect condition for the receptacle in which it will be sealed and cooked. At the eviscerating station, means are also provided for discharging the waste from the suction heads without breaking the vacuum; and other means are arranged to operate only those suction heads opposite which a fish is positioned.

In greater detail and referring to the drawings my apparatus comprises a long frame in which the mechanism is mounted, and having longitudinal members 12, cross members 13 and vertical supporting members or legs 14. These members are conveniently made of angle iron welded or bolted together; and brackets and extensions are fixed to the various frame members as needed to carry bearings and other parts.

Extending longitudinally of the frame on each side thereof, and spaced apart a convenient distance, in the instant case, about two feet, is a conveyor generally designated by the reference character 16, Figure 2, and comprising pocket blocks 17, mounted on chains 18 supported on rails 19 and running over sprockets fixed on shafts 21 and 20 at the ends of the frame. The shaft 21 is journaled in fixed bearings 22, but the shaft 20 is journaled in adjustable blocks 23 so that the tension of the conveyor chains may be adjusted.

On the outside of each of the conveyors 16 and extending parallel with it for a short distance is another and narrower conveyor 26, comprising pocket blocks 27 mounted on chains running over sprockets fixed on the adjustable shaft 20 and shaft 28 journaled in fixed bearings 29, Figure 1. The two conveyors on each side of the machine are so arranged that the pocket blocks 17 and 27 are in alignment throughout the length of the upper reach of the shorter conveyor, so that over this upper reach each two aligned pockets function as one receptacle for holding a fish, the head lying in the pocket of block 27.

Since it is desirable to put a direct pull on the upper reach of a conveyor such as these, the shaft 28 is rotated by a suitable chain 30 running over sprockets on shafts 28 and 21, the latter being the drive shaft for the conveyors 16.

Shaft 21 is driven from shaft 31 and given a step-by-step motion by a Geneva gear 32 interposed between the shafts; and shaft 31 is driven by gears 33 connecting it to shaft 34, which in turn is driven through chain 36 from shaft 37. This shaft is connected by any suitable means such as the belt 38 to a source of power.

Extending through the machine between the conveyors 16 is a web or belt conveyor 41 of any suitable construction and mounting, and upon which fish are conveyed to the machine. Workers standing on each side of the machine near the right end as viewed in Figures 1 and 2, take fish from this feed belt and fill the pockets of the conveyors 16—26, placing the heads in the pocket blocks 27. The feed belt is preferably a wire mesh fabric with its margins running in the angles 42; and if several of my machines are in line, a single feed belt travels through the line of machines, supplying all. If there is but one machine, the feed belt may terminate at any convenient point beyond the station where the fish are loaded by hand into the pocket blocks. Below the discharge end of the conveyor 41 is a salt water flume, not shown, into which fish remaining on the belt fall as it turns into the lower reach. The flume loader lifts them along with others to the feed belt. These devices are well understood and need not be described in detail.

The conveyors 16 and 26 are spaced a short distance apart as shown in Figure 2, and the pocket blocks 17 are each formed with a series of aligned transverse grooves 43 extending past the bottom of the pocket. This arrangement allows each set of aligned but spaced pocket blocks to carry the contained fish below the two rotary knives 44 and 45, mounted on the shaft 46 driven by suitable gears 47 from the shaft 37. Knife 44, which may be adjusted to work in any of the slots 43 according to the size of the fish in the run, severs the tails, while knife 45 severs the head. It will be noted that conveyor 26 ends just beyond the knife 45, so that the heads are dropped from the machine at this point as the pocket blocks in which they lie turn downwardly. The tails which are small and thin remain in the ends of the pockets and fall from the conveyor at the end of the upper reach.

From the above it will be clear that the conveyors on the sides of the machine are arranged to move the fish forward in a step-by-step movement; and this is designed so that two pockets on each side are presented at a time at each operating station. It is of course obvious that by a change in timing and the multiplication of parts any number of pockets may be included in a single step.

Shortly after leaving the knives, the fish in two adjacent pocket blocks are brought to rest at the eviscerating station in alignment with the suction head 49, Figure 7, comprising a block having suction ports 50 spaced so as to be in line with the visceral cavities of the two fish on the conveyor. The block is carried by the flange 51 on the housing 52 mounted on frame members. The arrangement of parts is such that the severed faces of the fish bodies are actually in contact with the face of the suction head. As soon as the fish are in position, mechanism is automatically operated to clamp the fish bodies in the pockets and connect the suction ports with a vacuumized chamber so that the visceral contents are literally jerked out during the brief pause of the conveyor.

As best shown in Figures 3, 4 and 9, the clamping means includes a plate or shoe 53, having a concave or arcuate lower face, and pivotally mounted on the end of the arm 54. A flat spring 55 engaging under the flat end of the arm tends to retain the shoe in approximately operative position while permitting it to adjust itself to the fish body as it seats on it. The arm 54 extends from a sleeve 56 pivotally mounted on the shaft 57, journaled on and extending longitudinally along the upper portion of the main frame. Since the fish must be held during each of the eviscerating and cleaning operations, a clamp arm 54 and related parts are arranged on each side of the machine at each of the operating points. On each side of the machine two fish are eviscerated at the same time; and each of these two are subjected to the fluid cleaning jets twice, so that on each side, there is a shaft 57, six sleeves 56, and six units of clamping means.

Each sleeve is shaped with a recess between its ends, in which lies an arm 58 adjustably threaded into the shaft 57. A tie rod 59 adjustably fixed in the flat head of the arm 58 and slidable to the limit set by its head 60 in the slotted end of the lug 61 projecting from the arm 54, provides means for positively lifting the clamp arm 54 and attached shoe when the shaft 57 swings the arm 58 counterclockwise. A compression spring 63 about the tie rod between the arm and the lug insures only a resilient pressure of the foot on the fish body when the shaft 57 swings the arm 58 clockwise.

Means are provided for oscillating the shaft 57 to lower the clamp shoes into the pocket blocks. Journaled on the shaft 57, Figures 3 and 4, is a sleeve 64 having an arm 65 at one end and a pinion 66 at the other. The pinion is in mesh with a vertically disposed rack 67 which is reciprocated through a planned movement by the cam rider 68 actuated by the cam 69 fixed on the shaft 31. The arm 65 is connected by link 71 to the adjustable length arm 72 of the rocker 73, journaled on the shaft 74, fixed longitudinally and centrally along the upper portion of the machine. The rocker is also provided with oppositely extending arms 76 and 77, the former connected by link 78 with an arm 79, carried by a collar 81, tight on the shaft 57. The link 82 connects the other rocker arm 77 to similar mechanism on the opposite side of the machine. From the above it will be seen that operation of the cam mechanism oscillates the shafts 57 to lower and raise the clamp shoes; and of course this movement is carefully planned to occur in time with the step-by-step progression of the fish holding pocket blocks.

If a fish is present in the pocket block aligned with a given suction port, the port opens and the visceral contents of the fish are sucked out. If a fish is not present, the port remains closed.

The suction head is formed with two ports each of which is controlled by an independently operated valve 83 journaled in the block forming the head, and having a shank 84 journaled in the bracket 86 which is carried by the blocks. The valve is resiliently held in its seat with the flange 87 pressed against the end of the block by the spring 88 surrounding the shank and interposed between the bracket and a pinion 89 fixed on the shank next to the flange. The pinion is in mesh with gear segment 91 pivoted on the bracket 86, and is connected by link 92 to the rocker 93, the upper arm of which is provided with a pin 94 adapted to be engaged by the latch 95, pivoted on the bar 96. The bar is slidably supported at its outer end on the bracket 97, and at its inner end is pivoted to the rocker arm 98, fixed on the shaft 74 so that when the shaft 74 oscillates, the bar moves back and forth. Oscillation of shaft 74 is secured by a link 99, connecting a fixed arm on the shaft to an arm rocked by a pinion 100 which in turn is oscillated by a rack and cam deriving motion from shaft 31, in the same manner as already explained in connection with the cam 69, Figure 4. If the latch 95 is up as shown in Figure 7, the reciprocation of the bar is without effect, but if the latch engages the pin 94, then the rocker 93 and connected segment 91 is actuated to turn the valve through 90° to open position, in which the opening 101 in the valve body is aligned with the port 50 and the passage 102, opening into the suction chamber 103, within the housing 52. This chamber is connected by a conduit 104 with a vacuum pump (not shown); and during operation of the machine the degree of vacuum is of the order of 25" of mercury, which is sufficient for fast and thorough action.

A single suction chamber serves both valves and a deflecting fin 105 directs the visceral matter toward the bottom of the chamber.

Whether or not the latch 95 picks up the pin 94 to operate the suction valve, depends on the position of the roller 106 journaled on the end of the arm 107 which extends from the sleeve 56 opposite to the clamp shoe carrying arm 54. If the clamp shoe seats on a fish, it does not sink low enough to raise the roller 106 sufficiently to lift the latch out of its normal engagement with the pin 94; and the valve is opened by reciprocation of the bar 96. If no fish is present in the pocket, the clamp shoe drops down into the pocket far enough to raise the roller 106 so that the latch 95 is raised out of engagement with the rocker pin, and merely rides back and forth on the roller as the bar 96 reciprocates, the valve remaining closed.

Means are provided for discharging the waste material from the suction chamber without breaking the vacuum. The housing 52 enclosing the chamber 103 is extended at the bottom into a valve housing with a transversely extending passage of rectangular cross section in which a pocket valve is slidably disposed. The valve comprises a bar 113 snugly fitting the passage and having a pocket 114 therethrough in register with the bottom of the chamber 103 in the outer position of the valve as shown in Figure 7; and in the inner position of the valve, in register with a discharge opening 116 in the bottom of the valve housing. The capacity of the pocket is greater than the waste from the two fish operated on at this station, and when the waste has dropped into the pocket, the valve is moved to discharge position where the waste falls from the machine, the body of the valve meanwhile filling the slideway and sealing the bottom of the chamber so that no leakage and loss of vacuum occurs. The pocket valve is operated in time with the action of the suction valves by an adjustable length lever arm 117 pivotally mounted at one end on bracket 118 and connected by link 119 with the valve bar. A cam 121 on shaft 122 is arranged to actuate the lever arm, the shaft being driven by chain 123 from the shaft 34.

Means are provided for subjecting the inside wall of the visceral cavity of the fish to jets of wet steam or hot water, or both steam and water to cook and loosen the black lining of the cavity and blow or flush it and any other adhering matter left by the suction head out of the cavity. Preferably the fish is first subjected to a steam jet which cooks and loosens the lining of the visceral cavity, and blows it out together with adhering visceral matter. It is then subjected to a hot water jet which flushes out any possible remaining material leaving the interior clean and white.

Slidably mounted in bracket 126, Figures 5 and 6, is a block or cross head 127 carrying on its inner end a double manifold comprising two aligned parts 128 and 129 for hot water and wet low pressure steam respectively. Steam is supplied to the manifold 128 through flexible conduit 130, and water is supplied to manifold 129 through flexible conduit 131, both conduits being connected to suitable sources of supply of water and steam respectively. Since a cooking temperature is desired, especially in the steam, the preferable temperatures for steam and water are about 210° F. and 200° F. respectively. The pressures under which the steam and water are released are relatively low, but high enough to insure that the flow will carry out the loosened material without injury to the remaining body.

From each manifold project two jet pipes 132, each pipe terminating in a head 133, Figure 10, which includes a backwardly directed annular flange 134. An aperture 136 in the head in line with the pipe discharges fluid (wet steam or hot water as the case may be) directly ahead of the pipe; and radial apertures 137 in the body of the head directs the fluid upon the inside face of the flange, so that it spreads thereon and discharges backwardly in a thin conical sheet which impinges at an angle on the visceral wall with maximum cleansing effect, as the jet pipe is introduced into the visceral cavity. The stream of fluid from the central opening in the head reaches and cleans the farthest depth of the cavity, while the cone of fluid moves in a direction opposite to the entering movement of the head, so that all portions of the cavity wall are reached and movement of waste is in the direction of the cavity opening through which the head enters. Four jet pipes are arranged to operate opposite four pocket blocks, and since the step-by-step movement of the conveyor presents two fish at a time for operation each fish is subjected to both steam and water cleaning treatments.

Means acting in time with movement of the conveyor, are provided for moving the manifold-supporting block 127 back and forth to move the jet pipes into and out of the fish lying in the pocket blocks of the conveyor. Journaled on the fixed shaft 141 is a sleeve 142 having an arm 143 at one end and a pinion 144 at the other. The pinion is in mesh with the rack 146 which is reciprocated through a calculated movement by a cam rider 147 actuated by the cam 148 fixed on the shaft 31.

The arm 143 is connected by link 151 with the arm 152 of the rocker 153, journaled on the shaft 74. The rocker is also provided with oppositely extending arms 154 and 156, the arm 154 connected by the link 157 with an arm 158, on the rocker 159, journaled on the shaft 141. A second arm 161 on this rocker is connected by link 162 with the cross head 127. Similar mechanism on the opposite side of the machine is operated by the link 163 connected to the arm 156 of the central rocker.

From this it will be understood that while I may supply steam to both manifolds and subject each fish to two steam treatments, a preferable arrangement for most conditions is wet steam at a pressure such that the visceral wall is not torn. The blast of steam then cooks the lining of the cavity and peels it off, carrying lining and other undesirable particles out of the cavity. On the next step forward the hot water flushes out the cavity leaving it perfectly free from objectionable matter.

Shortly after leaving the water cleansing station, the fish are dropped by the conveyor into a flume of salt water by which they are conveyed to a pool for brief storage. From the pool the fish are taken to the packing table where they are placed in cans, and then processed.

This application is a continuation-in-part of my copending application Serial No. 271,286 filed May 2, 1939, which has issued as Patent Number 2,326,146, dated August 10, 1943.

I claim:

1. Apparatus for dressing fish comprising means for feeding fish with an intermittent motion along a path, means disposed along the path for severing the heads from the fish, vacuum means disposed along said path for removing the entrails from the fish, and valve means operating in time with the feeding means for controlling said vacuum means.

2. Apparatus for dressing fish comprising means for feeding fish with an intermittent motion along a path, means disposed along the path for removing the heads from the fish, means disposed along the path for eviscerating the headless fish, clamp means timed with the feeding means for holding the fish during evisceration, means timed with the feeding means for operating the eviscerating means, and means controlled by the clamp means in the absence of a fish for preventing operation of the eviscerating means.

3. Apparatus for dressing fish comprising means for feeding fish with an intermittent motion along a path, means disposed along the path for removing the heads from the fish, a valve controlled suction head disposed along the path for eviscerating the headless fish, clamp means timed with the feeding means for holding the fish during evisceration, means timed with the feeding means for operating the valve of the suction head, and means actuated by the clamp means in the absence of a fish for disconnecting the valve operating means.

4. Apparatus for dressing fish comprising means for feeding fish with an intermittent motion along a path, means disposed along the path for removing the heads from the fish, a valve controlled suction head disposed along the path for eviscerating the headless fish, clamp means timed with the feeding means for holding the fish during evisceration, valve moving mechanism, a bar moving in time with the feeding means, a latch connecting the bar to the valve moving mechanism, and means actuated by the clamp means in the absence of a fish for disengaging the latch.

5. Apparatus for dressing fish comprising a vacuum operated suction head, a valve for controlling the suction head, conveyor means having a step-by-step motion for positioning against the suction head a succession of headless fish, clamp means acting in time with the conveyor means for holding the fish during its pause at the suction head, and means timed with the conveyor means for operating the suction head valve.

6. Apparatus for dressing fish comprising a vacuum operated suction head, a valve for controlling the suction head, conveyor means having a step-by-step motion for positioning against the suction head a succession of headless fish, clamp means acting in time with the conveyor means for holding the fish during its pause at the suction head, means timed with the conveyor means for operating the suction head valve, and means actuated by the clamp means in the absence of a fish for disconnecting the valve operating means.

7. Apparatus for dressing fish comprising a plurality of jet pipes, means for supplying steam to at least one of the jet pipes and hot water to at least one of the jet pipes, conveyor means having a step-by-step motion for positioning first adjacent the steam jet pipe and next adjacent the hot water jet pipe a succession of headless and eviscerated fish, and means timed with the conveyor means for moving the jet pipes into and out of the eviscerated fish.

8. Apparatus for dressing fish comprising a slideway, a manifold slidably mounted in the slideway, a plurality of jet pipes projecting from and in communication with the manifold, means for supplying a hot fluid to the manifold, conveyor means having a step-by-step motion for positioning adjacent the jet pipes a succession of headless and eviscerated fish, and means timed with the conveyor means for reciprocating the manifold to move the jet pipes into and out of the eviscerated fish.

9. Apparatus for dressing fish comprising a vaccum operated suction head, a valve for controlling the suction head, conveyor means for positioning against the suction head a succession of headless fish, and means timed with the positioning of the fish against the suction head for operating the suction head valve.

KARL KURZBIN.

REFERENCES CITED

The following references are of record in the file of this patent:

UNITED STATES PATENTS

| Number | Name | Date |
|---|---|---|
| 1,087,242 | Kelly | Feb. 17, 1914 |
| 1,262,319 | Fleischer | Apr. 9, 1918 |
| 1,606,377 | Murray | Nov. 9, 1926 |
| 1,734,580 | Hippenmeyer | Nov. 5, 1929 |
| 1,134,529 | Hauber | Apr. 6, 1915 |
| 1,125,655 | Cleveland | Jan. 19, 1915 |
| 1,134,530 | Hauber | Apr. 6, 1915 |
| 1,078,720 | Cleveland | Nov. 18, 1913 |
| 1,828,725 | Muller et al. | Oct. 20, 1931 |
| 1,853,328 | Youman | Apr. 12, 1932 |
| 1,926,417 | Youman | Sept. 12, 1933 |
| 2,166,939 | Christiansen | July 25, 1939 |

FOREIGN PATENTS

| Number | Country | Date |
|---|---|---|
| 685,288 | France | Mar. 31, 1930 |